United States Patent
Hamlin et al.

(10) Patent No.: US 11,431,886 B1
(45) Date of Patent: Aug. 30, 2022

(54) DEVICE MANAGEMENT FOR AN INFORMATION HANDLING SYSTEM

(71) Applicant: Dell Products L.P., Round Rock, TX (US)

(72) Inventors: Daniel Lawrence Hamlin, Round Rock, TX (US); Hariprasad Janardana Iyer, Round Rock, TX (US); Yao Hsien Huang, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 30 days.

(21) Appl. No.: 17/184,225

(22) Filed: Feb. 24, 2021

(51) Int. Cl.
*H04N 5/232* (2006.01)
*G06F 21/30* (2013.01)
*G06F 21/32* (2013.01)

(52) U.S. Cl.
CPC ......... *H04N 5/23206* (2013.01); *G06F 21/30* (2013.01); *G06F 21/32* (2013.01)

(58) Field of Classification Search
CPC ............. G06F 2209/509; G06F 9/5044; G06F 9/5027; G06F 9/505; G06F 21/30; G06F 21/32; H04N 5/232; H04N 5/23206
See application file for complete search history.

(56) References Cited

U.S. PATENT DOCUMENTS

| 10,430,558 B2 * | 10/2019 | Breitenfeld | ............ G06F 21/10 |
| 2015/0248230 A1 * | 9/2015 | Mark | ...................... H04L 67/10 715/747 |

* cited by examiner

*Primary Examiner* — Yogesh K Aggarwal
(74) *Attorney, Agent, or Firm* — Baker Botts, L.L.P.

(57) ABSTRACT

In one embodiment, a method for managing image sensors communicably coupled to an information handling system includes accessing a device inventory storing a list indicating the image sensors; identifying, from the list, an image sensor having a login functionality and a capture functionality, the login functionality causing the image sensor to capture identifying features of a user of the information handling system, the capture functionality causing the image sensor to capture images of the user; accessing a configuration inventory storing configuration policies indicating user permissions associated with the information handling system; determining that the login functionality of the image sensor is permitted based on the user permissions; programmatically enabling the login functionality of the image sensor; determining that the capture functionality of the image sensor is not permitted based on the user permissions; and programmatically disabling the capture functionality of the image sensor.

20 Claims, 4 Drawing Sheets

DEVICE MANAGEMENT FOR AN INFORMATION HANDLING SYSTEM

BACKGROUND

Field of the Disclosure

The disclosure relates generally to information handling systems, and in particular to device management for an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one embodiment, a method for managing a plurality of image sensors communicably coupled to an information handling system in a computing environment includes: accessing, by a management engine of the information handling system, a device inventory of the information handling system, the device inventory storing a list indicating the plurality of image sensors; identifying, from the list, an image sensor of the plurality of image sensors having a login functionality and a capture functionality, the login functionality causing the image sensor to capture one or more identifying features of a user of the information handling system, the capture functionality causing the image sensor to capture one or more images of the user; accessing a configuration inventory of the information handling system, the configuration inventory storing a plurality of configuration policies indicating user permissions associated with the information handling system; determining that the login functionality of the image sensor is permitted based on the user permissions; programmatically enabling the login functionality of the image sensor; determining that the capture functionality of the image sensor is not permitted based on the user permissions; and programmatically disabling the capture functionality of the image sensor.

In one or more of the disclosed embodiments, determining that the capture functionality of the image sensor is not permitted based on the user permissions includes: identifying, by the management engine, a user identification (ID) associated with the user of the information handling system; identifying, from the plurality of configuration policies stored in the configuration inventory, a configuration policy associated with the user based on the user ID, the configuration policy indicating whether the user is permitted to enable the capture functionality of the image sensor; and determining that the user is not permitted to enable the capture functionality of the image sensor based on the configuration policy.

In one or more of the disclosed embodiments, identifying the configuration policy associated with the user based on the user ID includes: sending the user ID to a management backend of the computing environment via a network, the management backend configured to generate the configuration policy associated with the user based on the user ID; receiving the configuration policy from the management backend via the network; and storing the configuration policy in the configuration inventory.

In one or more of the disclosed embodiments, the method further includes: receiving, by the management engine, a request from an application to enable the capture functionality of the image sensor, the application executing on the information handling system; accessing an image sensor driver stack associated with the image sensor, the image sensor driver stack indicating an instance of the application requesting an access to the image sensor; and removing the instance of the application from the image sensor driver stack to programmatically disable the access to the image sensor.

In one or more of the disclosed embodiments, programmatically disabling the capture functionality of the image sensor further includes: determining, by the management engine, that the capture functionality of the image sensor is not enabled by an application executing on the information handling system.

In one or more of the disclosed embodiments, the capture functionality is associated with a red, green, blue (RGB) camera functionality.

In one or more of the disclosed embodiments, the login functionality is associated with an infrared (IR) camera functionality.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This document describes a method for managing a plurality of image sensors communicably coupled to an information handling system in a computing environment that includes: accessing, by a management engine of the information handling system, a device inventory of the information handling system, the device inventory storing a list indicating the plurality of image sensors; identifying, from the list, an image sensor of the plurality of image sensors having a login functionality and a capture functionality, the login functionality causing the image sensor to capture one or more identifying features of a user of the information handling system, the capture functionality causing the image sensor to capture one or more images of the user; accessing a configuration inventory of the information handling system, the configuration inventory storing a plurality of configuration policies indicating user permissions associated with the information handling system; determining that the login functionality of the image sensor is permitted based on the user permissions; programmatically enabling the login functionality of the image sensor; determining that the capture functionality of the image sensor is not permitted based on the user permissions; and programmatically disabling the capture functionality of the image sensor.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-4 wherein like numbers are used to indicate like and corresponding parts.

Figure 1:
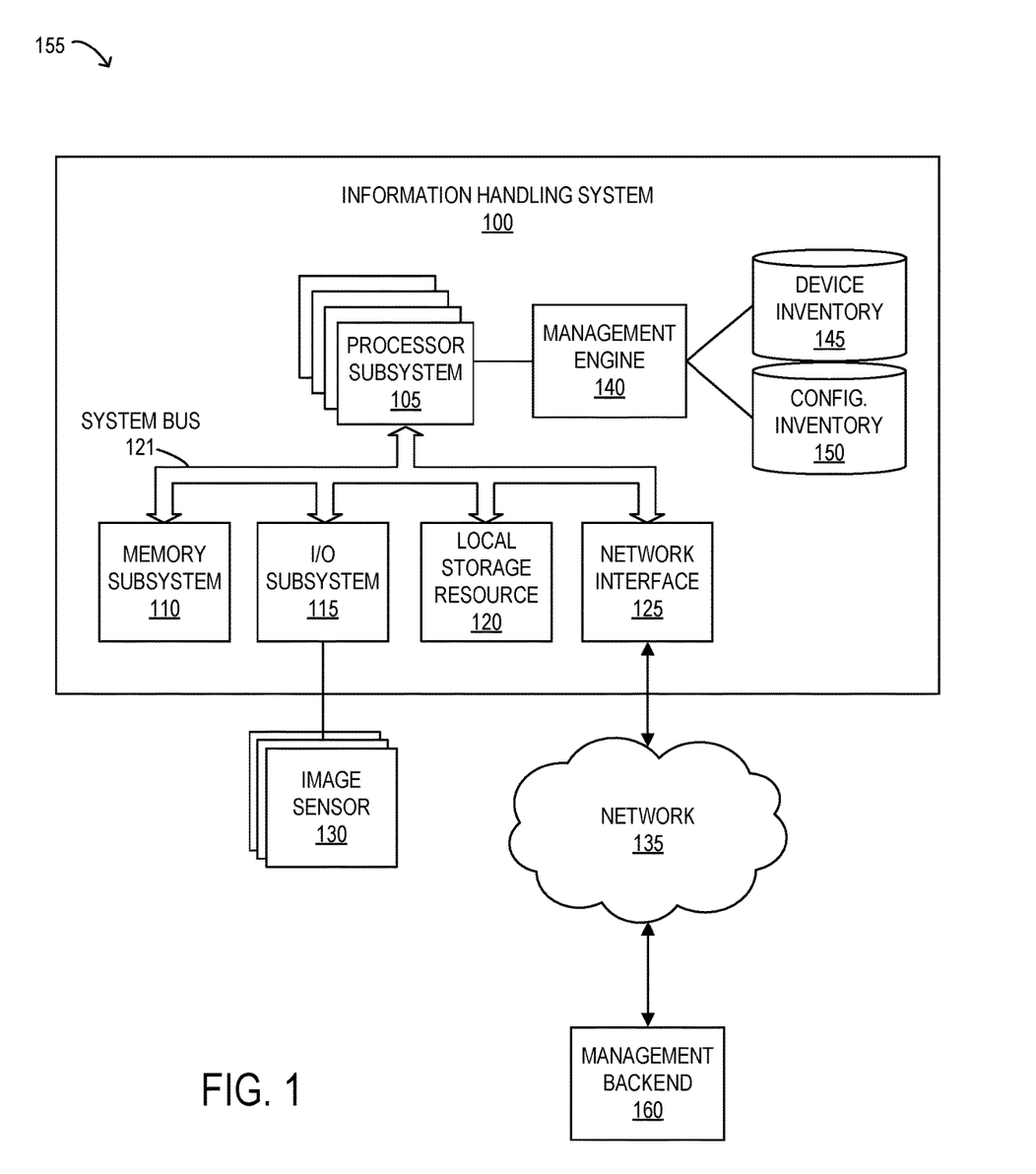
FIG. 1 is a block diagram of selected elements of an embodiment of a computing environment that includes an information handling system and one or more image sensors.

Turning now to the drawings, FIG. 1 illustrates a block diagram depicting selected elements of an information handling system 100 in accordance with some embodiments of the present disclosure. In other embodiments, information handling system 100 may represent different types of portable information handling systems, such as, display devices, head mounted displays, head mount display systems, smart phones, tablet computers, notebook computers, media players, foldable display systems, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems.

In the embodiment illustrated in FIG. 1, components of information handling system 100 may include, but are not limited to, a processor subsystem 105, which may comprise one or more processors, and system bus 121 that communicatively couples various system components to processor subsystem 105 including, for example, a memory subsystem 110, an I/O subsystem 115 communicably coupled to one or more image sensors 130, a local storage resource 120, and a network interface 125. System bus 121 may represent a variety of suitable types of bus structures (e.g., a memory bus, a peripheral bus, or a local bus) using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In one embodiment, processor subsystem 105 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 105 may interpret and/or execute program instructions and/or process data stored locally (e.g., in memory subsystem 110 and/or another component of information handling system). In the same or alternative embodiments, processor subsystem 105 may interpret and/or execute program instructions and/or process data stored remotely.

In one embodiment, memory subsystem 110 may comprise a system, device, or apparatus operable to retain and/or retrieve program instructions and/or data for a period of time (e.g., computer-readable media). Memory subsystem 110 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In one embodiment, I/O subsystem 115 may comprise a system, device, or apparatus generally operable to receive and/or transmit data to/from/within information handling system 100. I/O subsystem 115 may represent, for example, a variety of communication interfaces, graphics interfaces, video interfaces, user input interfaces, and/or peripheral interfaces. In various embodiments, I/O subsystem 115 may be used to support various peripheral devices, such as a touch panel, a keyboard, a display adapter, an accelerometer, a touch pad, a gyroscope, an IR sensor, a microphone, a sensor, or a camera, or another type of peripheral device.

In information handling system 100, image sensor 130 may comprise a system, device, or apparatus operable to receive and convert images into electrical signals. In particular, image sensor 130 may be or include a charge-coupled device (CCD) and/or complementary metal-oxide semiconductor (CMOS) image sensor configured to convert light into electrons such that information handling system 100 may use the electrons to process a digital image. In one embodiment, image sensor 130 may include an image-capture mode of operation, or a "capture functionality," causing image sensor 130 to capture one or more images of a user of information handling system 100. For example, image sensor 130 may be or include a webcam operable to capture one or more red, green, blue (RGB) images of a user of information handling system 100 during a video conference or web seminar. In another embodiment, image sensor 130 may include a feature-capture mode of operation, or a "login functionality," causing image sensor 130 to capture one or more identifying features of a user of information handling system 100. For example, image sensor 130 may be or include a webcam operable to capture one or more infrared (IR) images of a user of information handling system 100 to identify facial features of the user. Information handling system 100 may map the facial features of the user to a repository of biometrics for known users of information handling system to identify a match, thereby allowing the user to login to information handling system 100. In yet another embodiment, image sensor 130 may include, both, a login functionality and a capture functionality. For example, image sensor 130 may capture one or more IR images of a user of information handling system 100 to verify the user during a login operation and subsequently capture one or more RGB images of the user during a video conference. Image sensor 130 is described in further detail with respect to FIGS. 2 and 3.

In one embodiment, device inventory 145 may be a suitable system, apparatus, or device operable to store information describing one or more devices. In particular, device inventory 145 may be or include a repository used to store information describing various properties of hardware devices (e.g., device type, manufacturer, device description, driver details, and the like) installed on, or communicable coupled to, information handling system 100. In one embodiment, device inventory 145 may store a list indicating one or more image sensors 130 communicably coupled to information handling system 100. Specifically, device inventory 145 may store a list indicating one or more image sensors 130 and describing various attributes and/or functionalities associated with the one or more image sensors 130. For example, the list stored in device inventory 145 may indicate that a first image sensor 130—having a capture functionality—and a second image sensor 130—having a login functionality—are both communicably coupled to information handling system 100. In one embodiment, the list may additionally indicate an operational status, or state, of each device. In particular, the list stored in device inventory 145 may indicate whether a device is operational, or "enabled," or nonoperational, or "disabled." For example, an image sensor 130 communicably coupled to information handling system 100 may include an operational login functionality and a nonoperational capture functionality. In this example, the list stored in device inventory 145 may indicate the login functionality is enabled and that the capture functionality is disabled.

In one embodiment, various properties associated with hardware devices (e.g., image sensors 130) may be accessed by management engine 140. For example, management engine 140 may access device inventory 145 to identify an image sensor 130 communicably coupled to information handling system 100 (i.e., from the list stored in device inventory 145) and identify that the image sensor 130 includes a capture functionality that is enabled. In one embodiment, device inventory 145 may be or include a control panel applet of an operating system installed on information handling system 100 that includes a list that indicates and describes each hardware device communicably coupled to information handling system. In another embodiment, device inventory 145 may be or include a relational database in which hardware devices and associated properties are stored as entries within a list. In other embodiments, device inventory 145 may be or include a centralized database, distributed database, commercial database, operational database, and/or any other database management system suitable for storing information describing one or more devices. Device inventory 145 is described in further detail with respect to FIGS. 2 and 3.

In one embodiment, configuration inventory 150 may be a suitable system, apparatus, or device operable to store information describing permissions associated with information handling system 100. Specifically, configuration inventory 150 may be or include a repository used to store information describing various authorizations, or "user permissions," designated to users of information handling system 100 for accessing specific resources (e.g., files, documents, devices, device functionalities, and the like). In one embodiment, configuration inventory 150 may store one or more configuration policies indicating user permissions associated with information handling system 100. For example, configuration policies may be generated by an information technology decision maker (ITDM), microservice, management backend, and/or administrator of information handling systems 100 deployed throughout a business enterprise. In one embodiment, configuration policies stored in configuration inventory 150 may be used to establish one or more initial settings of information handling system 100. For example, configuration inventory 150 may store one or more configuration files used to establish initial settings such as applications settings, operating system settings, devices settings (i.e., device functionalities), language settings, security settings (i.e., user permissions), branding settings such as company logos, and the like. These initial settings may be established prior to a user, or users, logging into, or otherwise engaging with, information handling system 100.

In one embodiment, configuration policies stored in configuration inventory 150 may be static. For example, an administrator of a business enterprise may use configuration policies to establish initial settings for an information handling system 100 prior to a user, or users, logging into, or otherwise engaging with, information handling system 100. In another embodiment, configuration policies stored in configuration inventory 150 may be dynamic. For example, management engine 140 may identify a user of information handling system based on a user identification (ID) of the user and may send the user ID to management backend 160 via network 135. A configuration policy may be generated by management backend 160 based on the user ID and sent to the management engine 140 via network 135. In one embodiment, the configuration policy generated by management backend 160 may indicate whether the user is permitted to enable the capture functionality of an image sensor 130. In another embodiment, the configuration policy generated by management backend 160 may indicate whether the user is permitted to enable, either, the login functionality or the capture functionality of an image sensor 130. The management engine 140 may receive the configuration policy and store the configuration policy in configuration inventory 150. Once stored, management engine 140 may identify the configuration policy associated with the user based on the user ID. Management engine 140 may determine whether the user is permitted to enable the capture functionality of an image sensor 130 based on the configuration policy. For example, management engine 140 may determine that the user is not permitted to enable the capture functionality of an image sensor 130 based on the configuration policy. In one embodiment, configuration inventory 150 may be or include a relational database in which configuration policies are stored as entries. In other embodiments, configuration inventory 150 may be or include a centralized database, distributed database, commercial database, operational database, and/or any other database management system suitable for storing configuration policies. Configuration inventory 150 is described in further detail with respect to FIGS. 2 and 3.

In one embodiment, management engine 140 may be a suitable system, apparatus, or device operable to manage devices for information handling system 100. Specifically, management engine 140 may manage login and/or capture functionalities associated with one or more image sensors 130 communicably coupled to information handling system 100. Conventionally, login and/or capture functionalities of an image sensor may be broadly managed at the device level such that disabling a login functionality may additionally disable a capture functionality of the image sensor. Similarly, disabling a capture functionality of the image sensor may additionally disable a login functionality. Thus, a user that wishes to enable the login functionality of an image sensor for the purpose of logging into an information handling system using biometric login (e.g., facial recognition) must also enable the capture functionality of the image sensor, leaving the user susceptible to having one or more images captured by the image sensor while the information handling system is in use. As a result, a conventional image sensor may include a mechanism (e.g., mechanical shutter, cover, clip, and the like) used to obscure a user from a field of view of the image sensor. However, this solution may be cumbersome for users given that it requires a user to physically open or close the mechanism each instance the information handling system is used. Further, such a solution requires users to remember to physically close the mechanism after login (i.e., using the login functionality of the image sensor).

In contrast, management engine 140 may manage login and/or capture functionalities of image sensors on a granular level. Specifically, management engine 140 may programmatically enable a login functionality while disabling a capture functionality, programmatically enable a capture functionality while disabling a login functionality, programmatically enable both login and capture functionalities, and/or programmatically disable both login and capture functionalities. For example, management engine 140 may allow a user to log into information handling system 100 using identifying features (i.e., by enabling the login functionality) while avoiding the inherent susceptibility of having one or more images captured by the image sensor after login (i.e., by disabling the capture functionality). In this way, management engine 140 affords a user, or users, of information handling system 100 greater access to, both, convenience and privacy than conventional solutions, thereby enhancing overall user experience. Management engine 140 is described in further detail with respect to FIGS. 2 and 3.

In one embodiment, management backend 160 may be a suitable system, apparatus, or device operable to generate configuration policies for management engine 140. In particular, management backend 160 may generate a dynamic configuration policy for information handling system 100 dynamically based on a user ID as described above. In the embodiment illustrated in FIG. 1, management backend 160 may be communicatively coupled to information handling system 100 via network 135. In response to a user ID from management engine 140 (e.g., via network 135), management backend 160 may generate a dynamic configuration policy for information handling system 100 based on the user ID. That is, management backend 160 may identify a user of information handling system 100 indicated by the user ID and may generate a configuration policy dynamically based on the user permissions associated with the user. In this way, management backend 160 may generate dynamic configuration policies for information handling systems 100 within computing environment 155 that may be updated, or otherwise modified, based on individual users of information handling system 100.

In one embodiment, local storage resource 120 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In one embodiment, network interface 125 may be a suitable system, apparatus, or device operable to serve as an interface between information handling system 100 and a network 135. Network interface 125 may enable information handling system 100 to communicate over network 135 using a suitable transmission protocol and/or standard, including, but not limited to, transmission protocols and/or standards enumerated below with respect to the discussion of network 135. Network 135 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 125 may enable wired and/or wireless communications (e.g., NFC or Bluetooth) to and/or from information handling system 100.

In particular embodiments, network 135 may include one or more routers for routing data between client information handling systems 100 and server information handling systems 100. A device (e.g., a client information handling system 100 or a server information handling system 100) on network 135 may be addressed by a corresponding network address including, for example, an Internet protocol (IP)

address, an Internet name, a Windows Internet name service (WINS) name, a domain name or other system name. In particular embodiments, network 135 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

In one embodiment, network 135 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 135 and its various components may be implemented using hardware, software, or any combination thereof.

Figure 2:
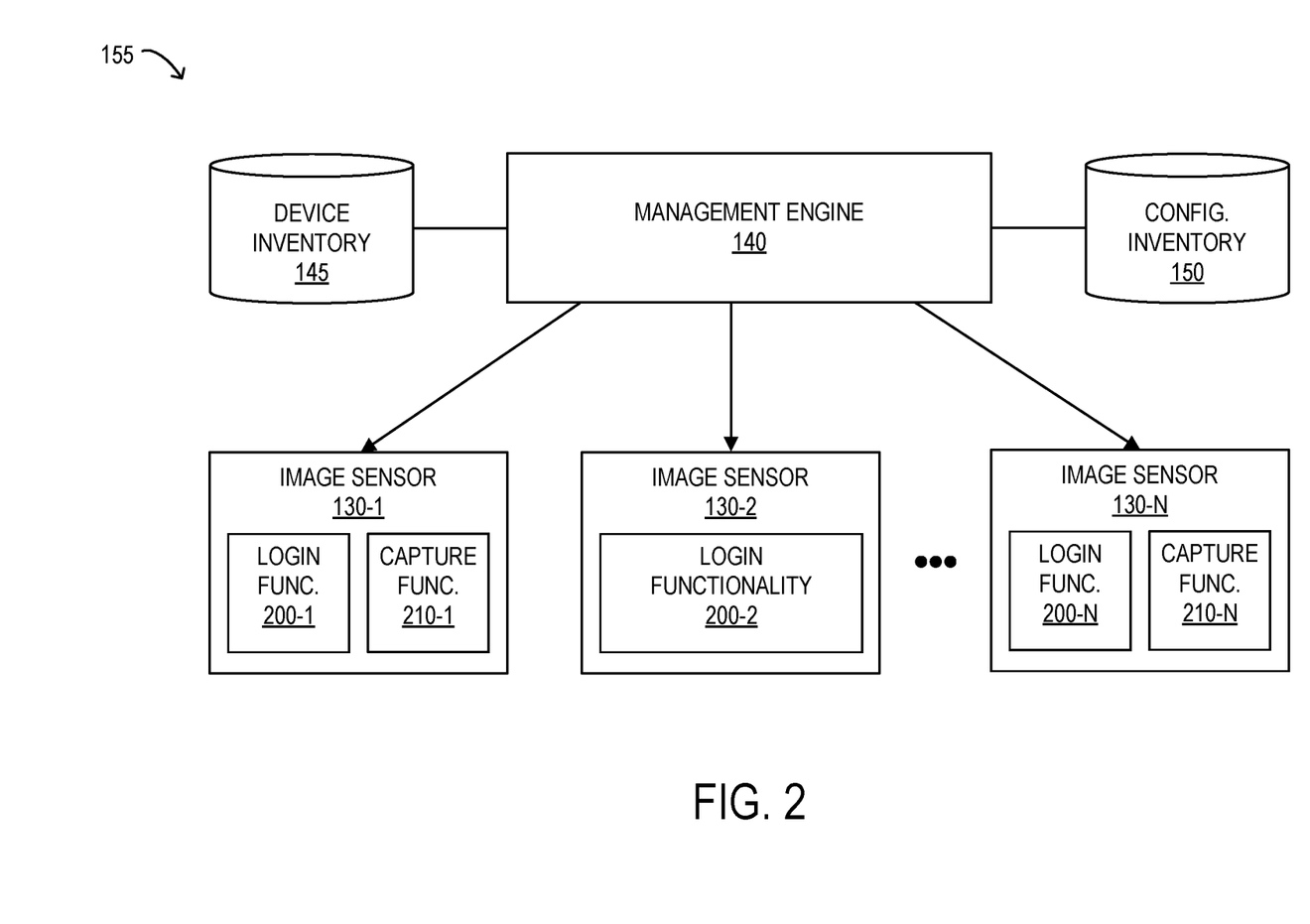
FIG. 2 is a block diagram of selected elements of an embodiment of a computing environment that includes a management engine, a device inventory, a configuration inventory, and one or more image sensors.

FIG. 2 is a block diagram of selected elements of an embodiment of a computing environment that includes a management engine, a device inventory, a configuration inventory, and one or more image sensors. In the embodiment illustrated in FIG. 2, management engine 140 is communicably coupled to device inventory 145 and configuration inventory 150. In addition, management engine 140 is communicably coupled to image sensors 130-1 through 130-N (collectively referred to herein as "image sensors 130") that include login functionalities 200-1 through 200-N (collectively referred to herein as "login functionalities 200") and capture functionalities 210-1 through 210-N (collectively referred to herein as "capture functionalities 210"). As shown in FIG. 2, image sensors 130-1 and 130-N include, both, login functionalities 200 and capture functionalities 210. In this embodiment, images sensors 130-1 and 130-N may be or include respective webcams communicably coupled to information handling system 100 that include, both, infrared (IR) and red, green, blue (RGB) camera functionalities. That is, image sensors 130-1 and 130-N may capture one or more IR images and/or one or more RGB images of a user of information handling system 100. In addition, image sensor 130-2 is shown in FIG. 2 to include login functionality 200-2. In this embodiment, image sensor 130-2 may be or include a built-in webcam, embedded within information handling system 100 to capture one or more identifying features of a user for biometric login purposes (e.g., facial recognition). Here, image sensor 130-2 may capture one or more IR images of the user. It is noted that although computing environment 155 includes management engine 140, device inventory 145, configuration inventory 150, and image sensors 130 in the embodiment illustrated in FIG. 2, other embodiments of computing environments 155 may include additional, fewer, and/or any combination of components suitable for managing devices for information handling system 100.

To identify each image sensor 130 in computing environment 155, management engine 140 may access device inventory 145. Specifically, management engine 140 may access a list of hardware devices stored in device inventory 145 indicating each image sensor 130 and each respective functionality associated with the image sensor 130. In one embodiment, images sensors 130 and respective functionalities may be indicated using multi-interface (MI) identifiers. For example, management engine 140 may identify image sensors 130 included in the list of hardware devices as indicated by an MI identifier, "MI00." Similarly, a capture functionality 210 (i.e., RGB functionality) associated with the image sensors 130 may be represented using the MI identifier "MI01" and a login functionality (i.e., IR functionality) may be represented using the MI identifier "MI02." In this example, management engine 140 may identify each respective image sensor 130 represented in the list stored in device inventory 145 (i.e., as indicated by MI identifier "MI00") and determine which image sensors 130 include capture functionality 210 (i.e., as indicated by MI identifier "MI01") and/or login functionality 200 (i.e., as indicated by MI identifier "MI02"). That is, management engine 140 may identify an image sensor 130 from the list having login functionality 200 and capture functionality 210. In another embodiment, management engine 140 may programmatically identify image sensors 130 and respective functionalities using interrogation software. For example, management engine 140 may interrogate, or call a function to interrogate, a device stream of information handling system 100 to identify image sensors 130 and corresponding functionalities.

Upon identifying each image sensor 130 in computing environment 155, management engine 140 may access configuration inventory 150 to identify one or more user permissions associated with information handling system 100. In particular, management engine 140 may access one or more configuration policies stored in configuration inventory 150 that indicate user permissions associated with information handling system 100. In one embodiment, each configuration policy stored in configuration inventory 150 may correspond to a respective information handling system 100, or information handling systems 100, within computing environment 155. For example, management engine 140 may access one or more configuration policies stored in configuration inventory 150 pertaining to a business enterprise to identify an election to enable login functionality 200 and disable capture functionality 210 of image sensors 130 communicably coupled to a first information handling system 100. In this example, the one or more configuration policies may additionally indicate an election to disable, both, login functionality 200 and capture functionality 210 of image sensors 130 communicably coupled to a second information handling system 100.

In one embodiment, each configuration policy stored in configuration inventory 150 may correspond to a respective user of information handling system 100. For example, management engine 140 may access a first configuration policy stored in configuration inventory 150 indicating that a first user of information handling system 100 may have user permissions that allow the first user to enable login functionality 200 but restrict the first user from accessing capture functionality 210. Here, the first user may be permitted to log into information handling system 100 using login functionality 200 of image sensor 130, or image sensors 130, but may not be permitted to capture one or more images using capture functionality 210 while information handling system 100 is in use. Similarly, management engine 140 may access a second configuration policy stored in configuration inventory 150 indicating that a second user of information handling system 100 may have user permissions that allow the second user to enable, both, login functionality 200 and capture functionality 210. In this example, the second user may be permitted to, both, log into information handling system 100 using login functionality 200 of image sensor 130, or image sensors 130, and capture one or more images using capture functionality 210 while information handling system 100 is in use.

In one embodiment, management engine 140 may programmatically enable login functionalities 200 of image sensors 130 in computing environment 155 while programmatically disabling capture functionalities 210 of image sensors 130. For example, a business enterprise may elect to allow users of information handling systems 100 deployed throughout the business enterprise to have access to biometric login capabilities using login functionality 200 while ensuring that no images are subsequently captured of sensitive materials located within the business enterprise using capture functionality 210. In this example, the election to enable login functionality 200 while disabling capture functionality 210 may be indicated in a configuration policy stored in configuration inventory 150. That is, management engine 140 may determine that login functionality 200 of image sensors 130 is permitted based on the user permissions indicated in configuration policies stored in configuration inventory 150. Similarly, management engine 140 may determine that capture functionality 210 of images sensors 130 is not permitted based on the user permissions indicated in the configuration policies.

In one embodiment, management engine 140 may use one or more application programming interfaces (APIs) (e.g., SetupAPI, Plug and Play (PnP) API, and the like) to access device settings and programmatically enable and/or disable functionalities associated with image sensors 130. In particular, management engine 140 may access the list of image sensors 130 and respective functionalities stored in device inventory 145, identify image sensors 130 having login functionality 200, and execute one or more APIs to access device settings for the image sensors 130 and enable the respective login functionalities 200. In the example shown in FIG. 2, management engine 140 may identify image sensors 130-1, 130-2, and 130-N from the list stored in device inventory 145 as having login functionalities 200-1, 200-2, and 200-N, respectively, and may use one or more APIs to programmatically enable the login functionalities 200 according to user permissions stored in configuration inventory 150. In addition, management engine 140 may access the list stored in device inventory 145 to identify image sensors 130 having capture functionality 210 and may execute one or more APIs to access device settings for the image sensors 130 and disable the respective capture functionalities 210. In the example shown in FIG. 2, management engine 140 may identify image sensors 130-1 and 130-N from the list stored in device inventory 145 as having capture functionalities 210-1 and 210-N and may use one or more APIs to programmatically disable the capture functionalities 210 according to user permissions stored in configuration inventory 150. In this way, management engine 140 provides a scalable solution for ensuring user privacy by disabling capture functionalities 210 of image sensors 130 while affording users the security and convenience of biometric login by enabling, or otherwise maintaining, login functionality 200. In one embodiment, management engine 140 may use one or more operating system APIs (e.g., Portable Operating System Interface (POSIX) APIs) to access device settings and programmatically enable and/or disable functionalities associated with image sensors 130. In other embodiments, management engine 140 may use one or more remote APIs, web APIs, and/or any combination of APIs suitable for accessing device settings and programmatically enabling and/or disabling functionalities associated with image sensors.

Figure 3:
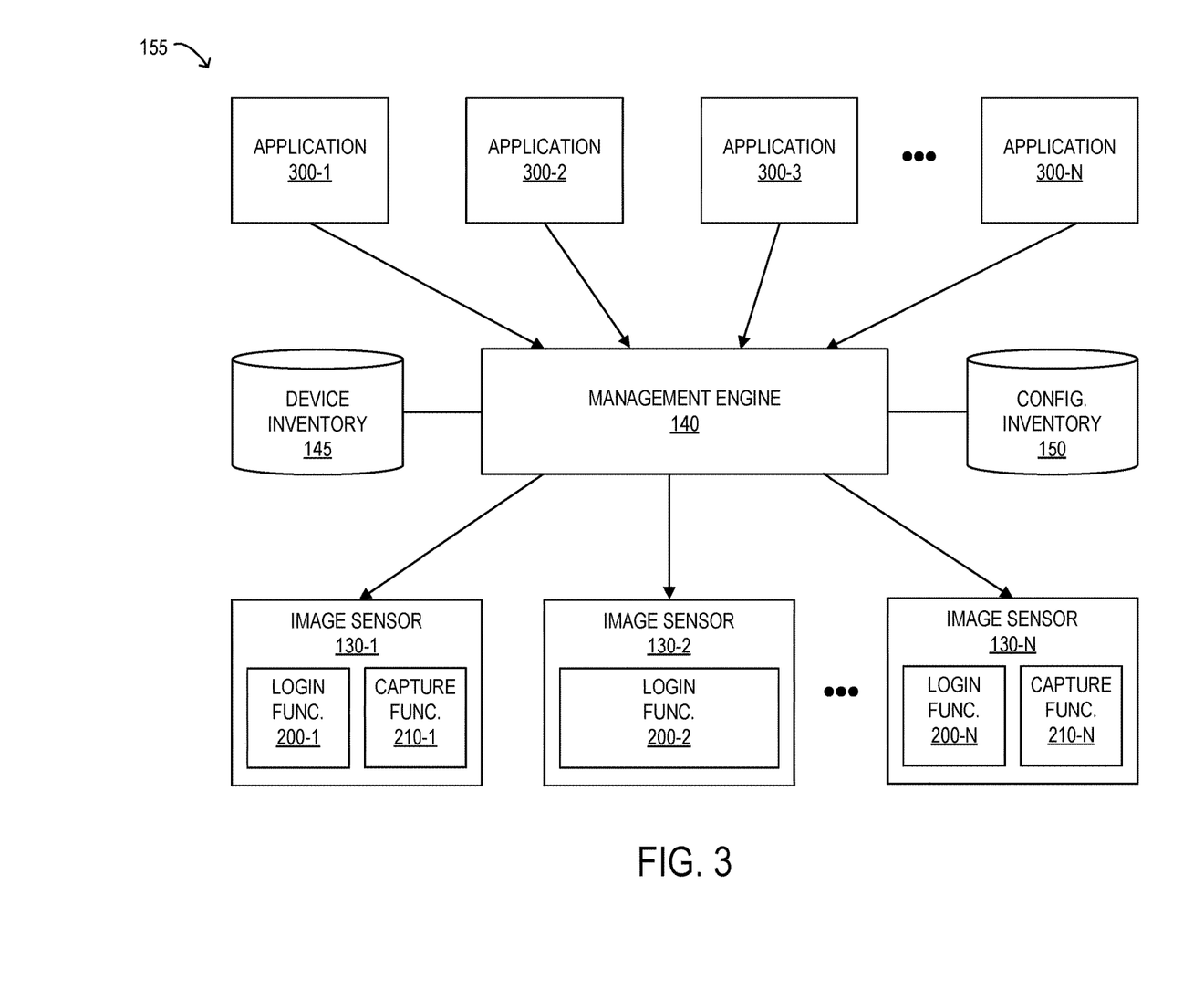
FIG. 3 is a block diagram of selected elements of an embodiment of a computing environment that includes a management engine, a device inventory, a configuration inventor, one or more image sensors, and one or more applications.

FIG. 3 is a block diagram of selected elements of an embodiment of a computing environment that includes a management engine, a device inventory, a configuration inventory, one or more image sensors, and one or more applications. In the embodiment illustrated in FIG. 3, management engine 140 is communicably coupled to device inventory 145, configuration inventory 150, and image sensors 130-1 through 130-N that include login functionalities 200-1 through 200-N and capture functionalities 210-1 through 210-N. As shown in FIG. 3, image sensors 130-1 and 130-N include, both, login functionalities 200 and capture functionalities 210. In this embodiment, images sensors 130-1 and 130-N may be or include respective webcams communicably coupled to information handling system 100 that include, both, infrared (IR) and red, green, blue (RGB) camera functionalities. That is, image sensors 130-1 and 130-N may capture one or more IR images and/or one or more RGB images of a user of information handling system 100. Image sensor 130-2 includes login functionality 200-2. In this embodiment, image sensor 130-2 may be or include a built-in webcam, embedded within information handling system 100 to capture one or more identifying features of a user for biometric login purposes (e.g., facial recognition). Here, image sensor 130-2 may capture one or more IR images of the user. In addition, computing environment 155 includes applications 300-1 through 300-N (collectively referred to herein as "applications 300"). In this embodiment, each application 300-1 through 300-N may request access to image sensors 130 to use login functionality 200 and/or capture functionality 210 for capturing one or more identifying features of a user and/or capturing one or more images of a user, respectively. It is noted that although computing environment 155 includes applications 300, management engine 140, device inventory 145, configuration inventory 150, and image sensors 130 in the embodiment illustrated in FIG. 2, other embodiments of computing environments 155 may include additional, fewer, and/or any combination of components suitable for managing devices for information handling system 100.

In one embodiment, each application 300-1 through 300-N may be or include a software application executing on information handling system 100. In the example shown in FIG. 3, applications 300-1 through 300-3 may be or include respective video conferencing applications executing on information handling system 100 during a user session (i.e., following a log in operation). Applications 300-1 through 300-3 may use capture functionality 210 of image sensors 130 to capture one or more images of a user. Specifically, applications 300-1 through 300-3 may use capture functionality 210 of image sensors 130-1 and/or 130-N to capture one or more RGB images of a user of information handling system 100 during a video conference or web seminar. Application 300-N may be or include a biometrics-based authentication application that enables users to log into information handling system 100 using login functionality 200 (i.e., prior to a user session). In particular, application 300-N may use login functionality 200 of image sensors 130-1 through 130-N to capture one or more IR images of a user of information handling system 100 that include one or more identifying features of the user used to verify the user during a login operation. In other embodiments, applications 300 may be or include social media applications, security applications, photo editing applications, video editing applications, and/or any other type of software application suitable for requesting access to image sensors 130.

In one embodiment, management engine 140 may receive a request from an application 300 to enable capture functionality 210 of one or more image sensors 130. For example, management engine 140 may receive a request from application 300-1 executing on information handling system 100 to enable capture functionality 210-1 of image sensor 130-1. Upon receiving the request, management engine 140 may access the list of image sensors 130 and respective functionalities stored in device inventory 145 and identify image sensors 130 having capture functionality 210. Management engine 140 may additionally access configuration inventory 150 to identify user permissions associated with information handling system 100. Specifically, management engine 140 may identify whether a user of information handling system 100 is permitted to enable capture functionality 210 of an image sensor 130 as indicated by one or more configuration policies stored in configuration inventory 150. In one embodiment, management engine 140 may manage image sensors 130 (i.e., enable and/or disable functionalities associated with image sensors 130) by accessing a device repository (not shown in figure) of information handling system 100. Here, each device communicably coupled to information handling system 100 may be represented as a respective device node within a driver stack or tree data structure (e.g., a PnP device tree). Specifically, each image sensor 130 in computing environment 155 may be represented as a respective device node that includes an image sensor device stack. Each image sensor device stack may indicate to management engine 140 one or more instances of applications 300 requesting access to the image sensor 130, or image sensors 130, corresponding to the image sensor device stack. If management engine 140 determines that a user is not permitted to enable capture functionality 210 of an image sensor 130, management engine 140 may locate the device node representing the image sensor 130 requested by an application 300, access the image sensor device stack associated with the image sensor 130, and remove each instance of an application 300, or applications 300, requesting access to the image sensor 130 to programmatically disable access to the image sensor 130. In this way, management engine 140 may disable access to a device node representing an image sensor 130 at the driver level (e.g., USB transport level, USB video class driver level, and the like), thereby filtering access to the device node while allowing the device node to remain enumerated on the driver stack.

In one embodiment, management engine 140 may first determine whether capture functionality 210 of an image sensor 130 is currently enabled by one or more applications 300 before disabling access to the device node representing the image sensor 130. If the capture functionality 210 of the image sensor 130 is currently enabled by one or more applications 300, management engine 140 may refrain from disabling access to the device node for the one or more applications 300. However, if the capture functionality 210 of the image sensor 130 is not currently enabled by one or more applications 300, management engine 140 may disable access to the device node representing the image sensor 130 as described above.

Figure 4:
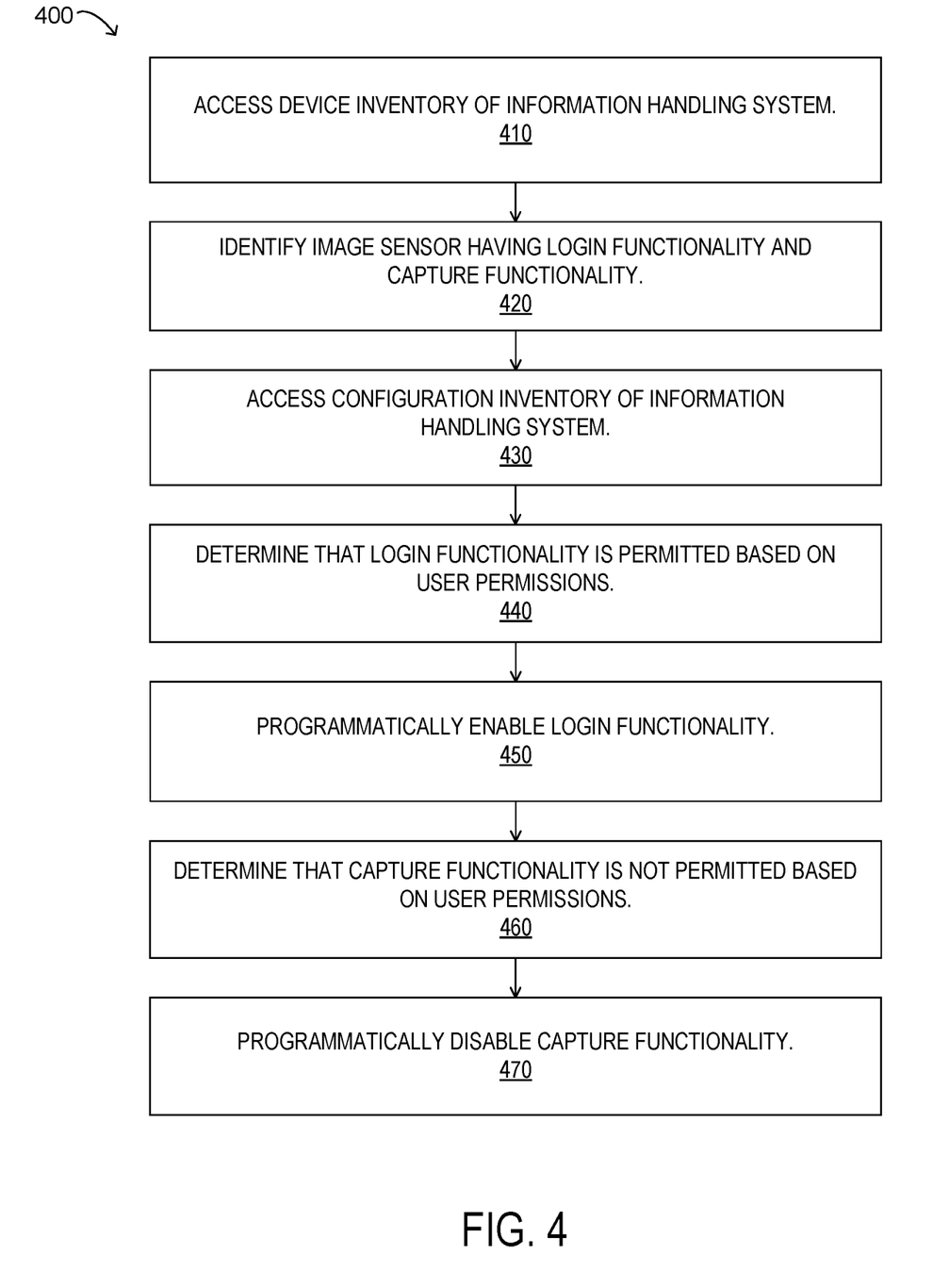
FIG. 4 is a flowchart depicting selected elements of an embodiment of a method for managing image sensors communicably coupled to an information handling system in a computing environment.

FIG. 4 is a flowchart depicting selected elements of an embodiment of a method for managing image sensors communicably coupled to an information handling system in a computing environment. It is noted that certain operations described in method 400 may be optional or may be rearranged in different embodiments.

Method 400 may begin at step 410, where the management engine of the information handling system may access a device inventory of the information handling system. The device inventory may store a list indicating the image sensors. For example, management engine 140 may access device inventory 145 shown in FIGS. 1-3. In step 420, the management engine may identify, from the list, an image sensor having a login functionality and a capture functionality. The login functionality may cause the image sensor to capture one or more identifying features of a user of the information handling system. The capture functionality may cause the image sensor to capture one or more images of the user. For example, management engine 140 may identify each respective image sensor 130 represented in the list stored in device inventory 145 (i.e., as indicated by MI identifier "MI00") and determine which image sensors 130 include capture functionality 210 (i.e., as indicated by MI identifier "MI01") and/or login functionality 200 (i.e., as indicated by MI identifier "MI02"). That is, management engine 140 may identify an image sensor 130 from the list having login functionality 200 and capture functionality 210 as described with respect to FIG. 2. In this example, capture functionality 210 may cause image sensors 130 to capture one or more red, green, blue (RGB) images of a user of information handling system 100 and login functionality 200 may cause image sensors 130 to capture one or more infrared (TR) images of a user to identify facial features (i.e., identifying features) of the user. In step 430, the management engine may access a configuration inventory of the information handling system. The configuration inventory may store configuration policies that indicate user permissions associated with the information handling system. For example, management engine 140 may access configuration inventory 150 to identify user permissions associated with information handling system 100. As described with respect to FIG. 3, management engine 140 may identify whether a user of information handling system 100 is permitted to enable capture functionality 210 of an image sensor 130 as indicated by one or more configuration policies stored in configuration inventory 150. In step 440, the management engine may determine that the login functionality of the image sensor is permitted based on the user permissions. For example, management engine 140 may determine that login functionality 200 of image sensors 130 is permitted based on the user permissions indicated in configuration policies stored in configuration inventory 150 as described with respect to FIG. 2. In step 450, the management engine may programmatically enable the login functionality of the image sensor. In the example shown in FIG. 2, management engine 140 may identify image sensors 130-1, 130-2, and 130-N from the list stored in device inventory 145 as having login functionalities 200-1, 200-2, and 200-N, respectively, and may use one or more APIs to programmatically enable the login functionalities 200 according to user permissions stored in configuration inventory 150. In step 460, the management engine may determine that the capture functionality of the image sensor is not permitted based on the user permissions. For example, management engine 140 may determine that capture functionality 210 of images sensors 130 is not permitted based on the user permissions indicated in the configuration policies as described with respect to FIG. 2. In step 470, the management engine may programmatically disable the capture functionality of the image sensor. In the example shown in FIG. 2, management engine 140 may identify image sensors 130-1 and 130-N from the list stored in device inventory 145 as having capture functionalities 210-1 and 210-N and may use one or more APIs to programmatically disable the capture functionalities 210 according to user permissions stored in configuration inventory 150.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for managing a plurality of image sensors communicably coupled to an information handling system in a computing environment, the method comprising:
    accessing, by a management engine of the information handling system, a device inventory of the information handling system, the device inventory storing a list indicating the plurality of image sensors;
    identifying, from the list, an image sensor of the plurality of image sensors having a login functionality and a capture functionality, the login functionality causing the image sensor to capture one or more identifying features of a user of the information handling system, the capture functionality causing the image sensor to capture one or more images of the user;
    accessing a configuration inventory of the information handling system, the configuration inventory storing a plurality of configuration policies indicating user permissions associated with the information handling system;
    determining that the login functionality of the image sensor is permitted based on the user permissions;
    programmatically enabling the login functionality of the image sensor;
    determining that the capture functionality of the image sensor is not permitted based on the user permissions; and
    programmatically disabling the capture functionality of the image sensor.

2. The method of claim 1, wherein determining that the capture functionality of the image sensor is not permitted based on the user permissions comprises:
    identifying, by the management engine, a user identification (ID) associated with the user of the information handling system;
    identifying, from the plurality of configuration policies stored in the configuration inventory, a configuration policy associated with the user based on the user ID, the configuration policy indicating whether the user is permitted to enable the capture functionality of the image sensor; and
    determining that the user is not permitted to enable the capture functionality of the image sensor based on the configuration policy.

3. The method of claim 2, wherein identifying the configuration policy associated with the user based on the user ID comprises:
    sending the user ID to a management backend of the computing environment via a network, the management backend configured to generate the configuration policy associated with the user based on the user ID;
    receiving the configuration policy from the management backend via the network; and
    storing the configuration policy in the configuration inventory.

4. The method of claim 1, further comprising:
    receiving, by the management engine, a request from an application to enable the capture functionality of the image sensor, the application executing on the information handling system;
    accessing an image sensor driver stack associated with the image sensor, the image sensor driver stack indicating an instance of the application requesting an access to the image sensor; and
    removing the instance of the application from the image sensor driver stack to programmatically disable the access to the image sensor.

5. The method of claim 1, wherein programmatically disabling the capture functionality of the image sensor further comprises:
    determining, by the management engine, that the capture functionality of the image sensor is not enabled by an application executing on the information handling system.

6. The method of claim 1, wherein the capture functionality is associated with a red, green, blue (RGB) camera functionality.

7. The method of claim 1, wherein the login functionality is associated with an infrared (IR) camera functionality.

8. One or more computer-readable non-transitory storage media embodying software that is operable when executed to:
    access, by a management engine of an information handling system, a device inventory of the information handling system, the device inventory storing a list indicating a plurality of image sensors communicably coupled to the information handling system in a computing environment;

identify, from the list, an image sensor of the plurality of image sensors having a login functionality and a capture functionality, the login functionality causing the image sensor to capture one or more identifying features of a user of the information handling system, the capture functionality causing the image sensor to capture one or more images of the user;

access a configuration inventory of the information handling system, the configuration inventory storing a plurality of configuration policies indicating user permissions associated with the information handling system;

determine that the login functionality of the image sensor is permitted based on the user permissions;

programmatically enable the login functionality of the image sensor;

determine that the capture functionality of the image sensor is not permitted based on the user permissions; and programmatically disable the capture functionality of the image sensor.

9. The media of claim 8, wherein to determine that the capture functionality of the image sensor is not permitted based on the user permissions, the software is further operable when executed to:

identify, by the management engine, a user identification (ID) associated with the user of the information handling system;

identify, from the plurality of configuration policies stored in the configuration inventory, a configuration policy associated with the user based on the user ID, the configuration policy indicating whether the user is permitted to enable the capture functionality of the image sensor; and determine that the user is not permitted to enable the capture functionality of the image sensor based on the configuration policy.

10. The media of claim 9, wherein to identify the configuration policy associated with the user based on the user ID, the software is further operable when executed to:

send the user ID to a management backend of the computing environment via a network, the management backend configured to generate the configuration policy associated with the user based on the user ID;

receive the configuration policy from the management backend via the network; and store the configuration policy in the configuration inventory.

11. The media of claim 8, wherein the software is further operable when executed to:

receive, by the management engine, a request from an application to enable the capture functionality of the image sensor, the application executing on the information handling system;

access an image sensor driver stack associated with the image sensor, the image sensor driver stack indicating an instance of the application requesting an access to the image sensor; and remove the instance of the application from the image sensor driver stack to programmatically disable the access to the image sensor.

12. The media of claim 8, wherein to programmatically disable the capture functionality of the image sensor, the software is further operable when executed to:

determine, by the management engine, that the capture functionality of the image sensor is not enabled by an application executing on the information handling system.

13. The media of claim 8, wherein the capture functionality is associated with a red, green, blue (RGB) camera functionality.

14. The media of claim 8, wherein the login functionality is associated with an infrared (IR) camera functionality.

15. A computing environment, comprising:

an information handling system including one or more processors; and one or more computer-readable non-transitory storage media coupled to one or more of the processors and comprising instructions operable when executed by one or more of the processors to cause the system to:

access, by a management engine of the information handling system, a device inventory of the information handling system, the device inventory storing a list indicating a plurality of image sensors communicably coupled to the information handling system in the computing environment;

identify, from the list, an image sensor of the plurality of image sensors having a login functionality and a capture functionality, the login functionality causing the image sensor to capture one or more identifying features of a user of the information handling system, the capture functionality causing the image sensor to capture one or more images of the user;

access a configuration inventory of the information handling system, the configuration inventory storing a plurality of configuration policies indicating user permissions associated with the information handling system;

determine that the login functionality of the image sensor is permitted based on the user permissions;

programmatically enable the login functionality of the image sensor;

determine that the capture functionality of the image sensor is not permitted based on the user permissions; and programmatically disable the capture functionality of the image sensor.

16. The computing environment of claim 15, wherein to determine that the capture functionality of the image sensor is not permitted based on the user permissions, the processors are further operable when executed to:

identify, by the management engine, a user identification (ID) associated with the user of the information handling system;

identify, from the plurality of configuration policies stored in the configuration inventory, a configuration policy associated with the user based on the user ID, the configuration policy indicating whether the user is permitted to enable the capture functionality of the image sensor; and determine that the user is not permitted to enable the capture functionality of the image sensor based on the configuration policy.

17. The computing environment of claim 16, wherein to identify the configuration policy associated with the user based on the user ID, the processors are further operable when executed to:

send the user ID to a management backend of the computing environment via a network, the management backend configured to generate the configuration policy associated with the user based on the user ID;

receive the configuration policy from the management backend via the network; and store the configuration policy in the configuration inventory.

18. The computing environment of claim 15, wherein the processors are further operable when executed to:

receive, by the management engine, a request from an application to enable the capture functionality of the image sensor, the application executing on the information handling system;

access an image sensor driver stack associated with the image sensor, the image sensor driver stack indicating an instance of the application requesting an access to the image sensor; and remove the instance of the application from the image sensor driver stack to programmatically disable the access to the image sensor.

19. The computing environment of claim 15, wherein the capture functionality is associated with a red, green, blue (RGB) camera functionality.

20. The computing environment of claim 15, wherein the login functionality is associated with an infrared (IR) camera functionality.

* * * * *